United States Patent [19]
Dodich et al.

[11] Patent Number: 4,739,816
[45] Date of Patent: Apr. 26, 1988

[54] VENETIAN BLIND SYSTEM FOR GREENHOUSES

[75] Inventors: James Dodich, New Milford; Geoffrey M. Garlow, Glen Rock, both of N.J.

[73] Assignee: Levolor Lorentzen, Inc., Lyndhurst, N.J.

[21] Appl. No.: 770,954

[22] Filed: Aug. 30, 1985

[51] Int. Cl.$^4$ .............................................. E06B 9/38
[52] U.S. Cl. .............................. 160/168.1; 160/115; 160/172
[58] Field of Search ........... 160/166 R, 168 R, 178 R, 160/178 E, 84 R, 172, 167, 166 A, 115

[56] References Cited

U.S. PATENT DOCUMENTS

| | | |
|---|---|---|
| 1,121,022 | 12/1914 | Klassig . |
| 2,214,539 | 9/1940 | Reinike ............................ 160/115 |
| 2,296,010 | 9/1942 | Balthasar ......................... 160/115 |
| 2,299,701 | 10/1942 | Michell ............................ 160/115 |
| 2,328,305 | 8/1943 | De Stefano . |
| 2,471,710 | 5/1949 | Adler ............................ 160/178 R |
| 2,579,485 | 12/1951 | Ferguson et al. ................ 160/115 |
| 2,654,425 | 10/1953 | Hayner . |
| 2,662,593 | 12/1953 | Walker ........................... 160/178 R |
| 2,918,121 | 12/1959 | Gibble ............................. 160/115 |
| 3,265,117 | 8/1966 | Lorentzen ........................ 160/174 |
| 3,280,890 | 10/1966 | Preziosi . |
| 3,425,479 | 2/1969 | Lorentzen . |
| 3,646,986 | 3/1972 | Anderle . |
| 3,721,285 | 3/1973 | Debs . |
| 3,818,969 | 6/1974 | Debs .............................. 160/168 |
| 3,982,355 | 9/1976 | Piercey . |
| 4,441,540 | 4/1984 | Tsuhako ......................... 160/168 R |
| 4,473,101 | 9/1984 | Langeler . |
| 4,556,095 | 12/1985 | Lewis ............................. 160/166 R |
| 4,557,309 | 12/1985 | Judkins ........................... 160/84 R |

FOREIGN PATENT DOCUMENTS

| | | | |
|---|---|---|---|
| 242338 | 9/1965 | Austria ........................ 160/166 R |
| 248089 | 7/1966 | Austria ........................ 160/178 R |
| 0096518 | 6/1982 | European Pat. Off. ........ 160/166 R |

OTHER PUBLICATIONS

Levolor Lorentzern, Inc., Chartalog 49-1, "Slats & Accessories", 1973, 1978.
Flexalum, vol. No. 2, Bulletin No. R-13, A-V 1, Jul. 25, 1957 (5 pages).

Primary Examiner—Ramon S. Britts
Assistant Examiner—Karen J. Chotkowski

[57] ABSTRACT

A Venetian blind system for the interior of greenhouses having pitched overhead windows and arcuate windows merging into vertical side windows including a first Venetian blind having a head channel secured at the peak of the greenhouse and a bottom channel detachably secured at the lower end of the pitched windows, and slats supported by ladders suspended between the channels, the first blind being provided with springs within the bottom channel to provide tension on forward and rearward legs of the ladders to firmly retain the slats; and a second Venetian blind having a head channel secured to an upper portion of a window frame above the arcuate windows, the slats of the second blind being provided with notches at the ends thereof, and guide rails on each side of the window frame extending from the peak of the greenhouse to the bottom of the lowermost Venetian blind for supporting the slats of the first blind and the notched slats of the second blind. A horizontal sky light installation is also described.

11 Claims, 5 Drawing Sheets

VENETIAN BLIND SYSTEM FOR GREENHOUSES

This invention relates to a Venetian blind system for greenhouses and the like, and more particularly, to a Venetian blind system for covering the interior pitched ceiling of a greenhouse, as well as that portion of a greenhouse defined by curved surfaces connecting with a pitched ceiling and merging into vertical side walls thereof.

BACKGROUND OF THE INVENTION

Various solutions have been proposed for the installation of Venetian blinds on horizontal or inclined surfaces such as ceiling skylights and pitched walls, and on curved surfaces, including fixed blinds which are not retractable but tiltable and retractable blinds which are tiltable but supported by a tensioned wire or rods, as known in the art.

Many fixed blinds generally involve complicated mechanical systems merely to open or close the slats by tilting, but not to retract or extend the entire blind over the window surface. Such fixed blinds make it practically impossible to clean the window adjacent thereto, without removing the entire installation. Other blinds suspended by rods or wires, even though retractable have further limitations.

When the glass to be covered by the blind is in the ceiling of a greenhouse, or a skylight having a pitch of say 30° to 40° from the horizontal plane, or indeed, is disposed in a horizontal installation, the mere use of a supporting wire or rod through the slats is not sufficient to assure optimum performance of the blind.

On the other hand if conventional means are employed for suspension of the blind in such installations, the slats, upon adjusting the same to a closed position in the conventional mannerfor closing the blind, reach a point where the weight of the slats will cause them to "flop" closed or to remain closed and hang on the cross rungs of the ladder ordinarily used to open and close the same, even if the slats are supported by a guy wire or other means of support.

In view of the foregoing, it has not heretofore been possible to effectively design a Venetian blind that is fully retractable on window surfaces which are horizontal or of such low pitch as indicated above and which is capable of achieving the performance demanded for such installations.

Accordingly, it is an object accomplished by this invention to provide a Venetian blind which is both tiltable and retractable for windows which are horizontal or of relatively low pitch.

The provision of a Venetian blind for greenhouses defined by curved walls connecting with a pitched ceiling and merging into vertical side walls thereof also presents problems not heretofore completely solved by the prior art.

If a conventional Venetian blind is suspended inside an arcuate surface, the closing angle of the slats will change with the arc of the surface, thereby causing unacceptable slat closure. Desirably, complete closure of the slats should be achieved over the entire area of the arcuate surface as well as the vertical portion of the blind when the tilt mechanism is adjusted to a closed position. This just does not happen with conventional suspension systems, whether they include curved rods or the like passing through the slats, due to the fact that unequal forces are applied to the front and back legs of each of the ladders supporting the blind slats.

Accordingly, another object of the invention is accomplished by providing, secondly, an improved retractable blind adapted to cover a curved surface merging into a vertical surface.

SUMMARY OF THE INVENTION

As can be seen from the foregoing, the objects of the invention are to overcome the aforesaid deficiencies of the prior art, which are accomplished by providing (1) an interior Venetian blind system with tiltable slats in a retractable blind for horizontal or inclined window surfaces, such as greenhouses, skylights and the like, and (2) a cooperating system for greenhouses which has a retractable blind adapted to cover an interior curved surface merging into a vertical surface.

These objects are more specifically accomplished, in the case of a greenhouse, by providing first on an inclined window having a pitch of say 30° to 40° a blind having a head channel supported at the upper portion of a pitched window, a bottom rail on the lower portion of the window and a plurality of slats suspended on ladders supported therebetween and further supported by side retaining rails for the slats. The inner and outer longitudinal portions of the ladders are maintained under tension, preferably by providing separate spring tensioning means connecting outer and inner longitudinal legs of the ladders to equalize the tension on the ladders which carry the blind slats and thereby to provide more positive control over slat movement, thus preventing the slats from flopping or opening unnecessarily while the slats are tilted from an open to a closed position. By means of this construction the slats can be positively opened and closed, even though the blind is installed in a horizontal or inclined position. Such positive control of the opening and closing of the slats by tilting is assured by providing slat clips to secure the slats with respect to the ladder rungs, as more fully described hereinafter.

Tensioned guide wires are provided through the outer end portions of the blind slats to prevent canting or twisting of the slats and to retain the slats on their supporting side rails as they are retracted or extended over the window opening, but without lending substantial support to the slats.

Another object is accomplished, secondly, by providing a retaining rail, preferably of plastic material, mounted on the mullions forming the pitched portion of the greenhouse and continuing over the same curvature of the mullions corresponding to the curved glass surfaces, and by providing notches in the ends of the slats of the blind to ride on the plastic rail about the curved surface and continuing into the vertical portion of the greenhouse. Such notches facilitate pivoting of the slats over the curved portion of the retaining rail at the center line of the slats and thereby to achieve closure of the slats in any position suspended on the curved retaining rail, as well as to guide the vertically suspended portion of the slats.

DETAILED DESCRIPTION

The invention will be best understood by the following detailed description of the preferred embodiments, in connection with the accompanying drawings, wherein.

Figure 1:
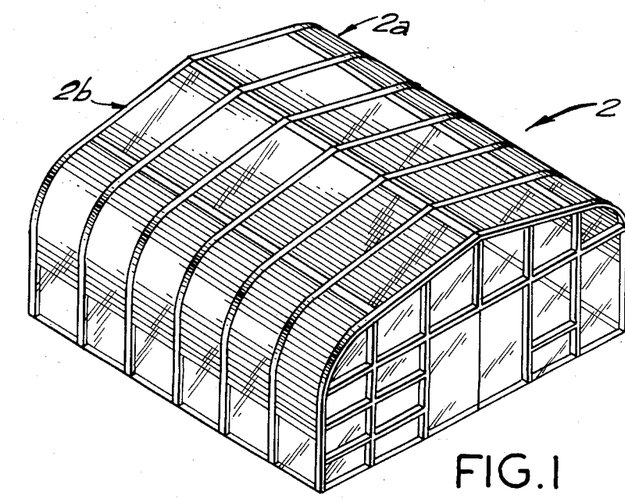
FIG. 1 is a perspective view from the top and end of a typical freestanding greenhouse provided with a Venetian blind system in the ceiling and side walls according to the present invention.

As indicated above, FIG. 1 shows a typical freestanding greenhouse 2 provided with a Venetian blind system installed on the interior thereof in accordance with the present invention and forming two portions 2a and 2b meeting at the peak.

Figures 2, 3:
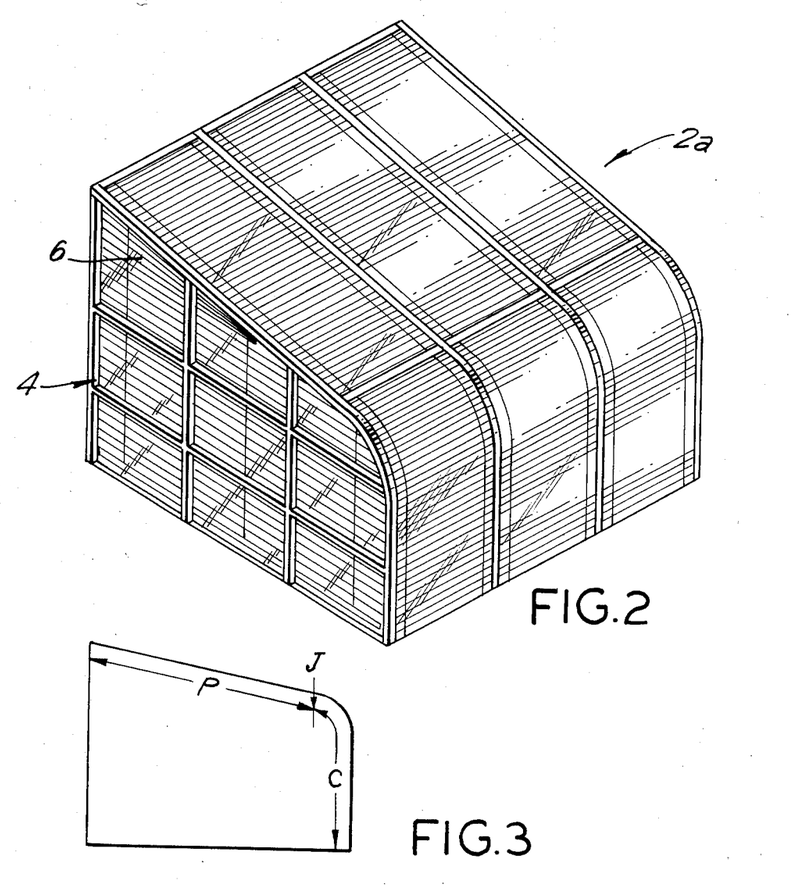
FIG. 2 is a perspective view from the top and side of a greenhouse adapted to be attached to a building structure and provided with a Venetian blind system in the ceiling and side walls according to the present invention.
FIG. 3 is a schematic view illustrating a Venetian blind system wherein two blinds are provided, the first to cover the inside of the pitched ceiling or roof P and the second to cover the inside of curved portion C extending along the side walls, the two blinds meeting and being joined at point J.

FIG. 2 shows a greenhouse which is effectively divided at the peak of FIG. 1 to provide a portion 2a (or 2b) which is attachable to an existing building structure, and which also is provided with the same Venetian blind system installed on the interior thereof.

The vertical end walls of FIGS. 1 and 2, as more specifically illustrated by the end wall 4 of FIG. 2, which may or may not have a door, is provided with a Venetian blind 6 of known design for "A-frame" construction, as exemplified by U.S. Pat. No. 3,646,986. Such a blind is preferably modified by locating the lift cord lock centrally near one end of the head channel so that the lift cord may be disposed on either side of the blind slats, and thereby facilitate suspension of the blind on either end of the greenhouse without constructing a different blind for each end.

The blind system comprising the present invention is schematically illustrated in FIG. 3, wherein "P" represents a pitched blind extending beneath the pitched ceiling of a greenhouse and "C" represents a blind extending beneath the curved portion of the greenhouse and terminating in a vertical wall, the two blinds meeting at a junction point "J" to complete the system.

Figures 4, 8:
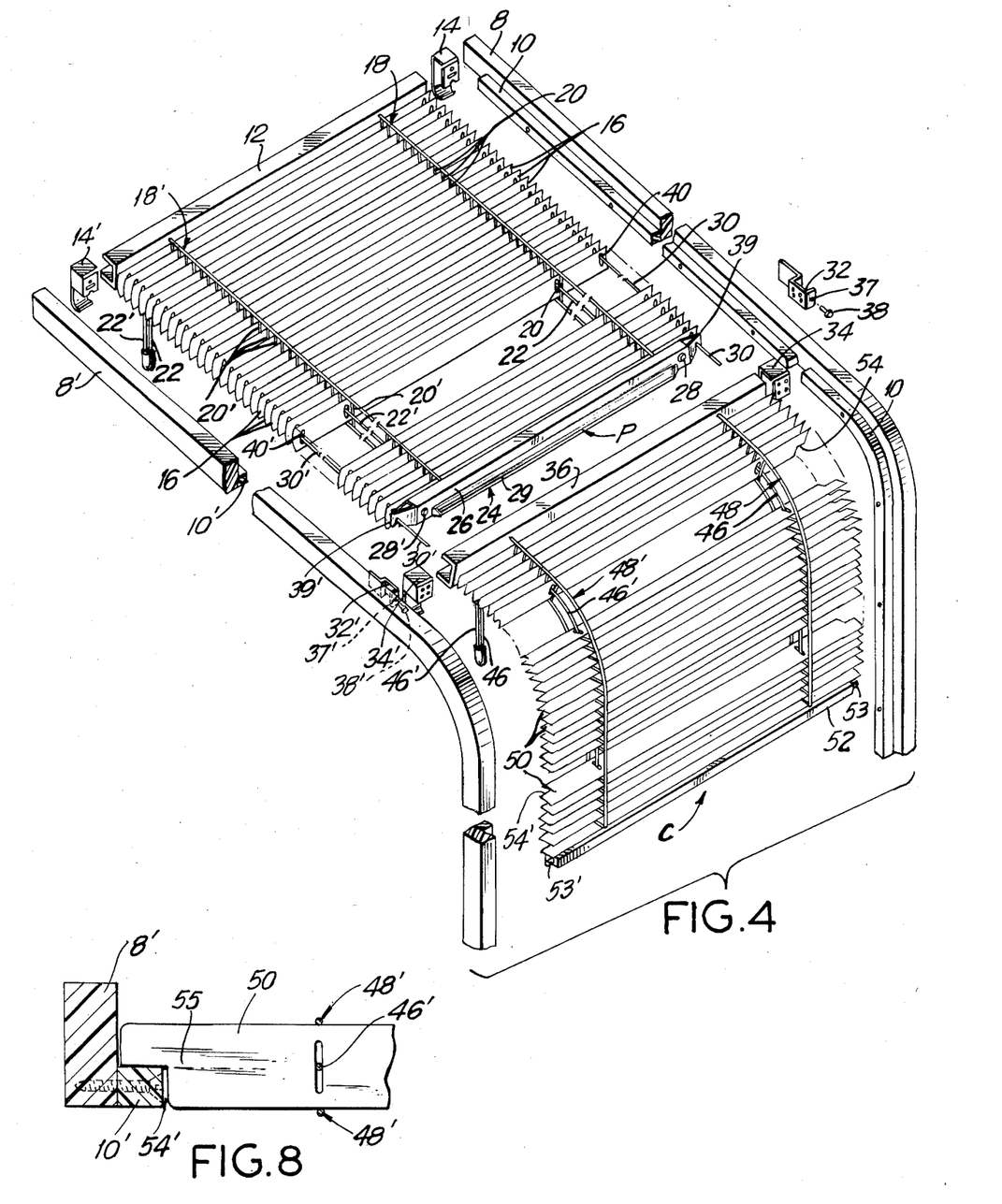
FIG. 4 is an exploded view, in perspective, of a Venetian blind system showing a blind suspended beneath the glass under the pitched portion P of FIG. 3 and a blind extending beneath the glass under the curved portion C of FIG. 3 and over the vertical side wall of the greenhouse.
FIG. 8 is an end elevational view, partly in section, showing more specifically, the manner of suspension of the slats in the lower blind C on a mullion and guide rail.

The system is best illustrated by FIG. 4, which is an exploded view of both blinds over areas P and C of FIG. 3.

The system is supported beneath the supporting structure of the greenhouse which in turn comprises mullions 8 and 8' for each module to support the top glass or plastic glazing, the mullions being connected by cross members to support glass panels as desired, and not shown.

The mullions 8 and 8' extend from the peak of the greenhouse to the base thereof and are curved between the juncture of the pitched and vertical portions thereof to form a substantially continuous support for the glazing.

Each mullion is provided with a lower retaining rail 10 and 10', respectively, secured to the corresponding mullions by screws or the like and extending over the entire length thereof from the peak of the greenhouse to the lowermost portion thereof. Retaining rails 10 and 10' are preferably composed of a plastic material exhibiting a low coefficient of friction, such as polyvinyl chloride, polyethylene, polytetrafluoroethylene and the like, thereby facilitating free movement of the blind slats on the top thereof, as will be more fully described. The cross-sections of rails 10 and 10' are preferably of rectangular shape, but may be shaped arcuately from the top to bottom as viewed from the inside of the mullions 8 and 8' to further reduce frictional engagement of the slats 16 against retaining rails 10 and 10'

The upper blind covering area P comprises a head channel 12 supported by end brackets 14 and 14' of conventional design, except that the head channel 12 is disposed on its side in contrast to the normal disposition of a head channel in horizontal blinds installed on vertical windows. The supporting end brackets 14 and 14' are secured to mullions 8 and 8', respectively.

The head channel 12 houses conventional means to tilt the slats 16, as in U.S. Pat. No. 3,425,479, through ladders 18 and 18' and to elevate the blind by means of lift cords 22, 22', also via conventional means.

The slats 16 of the upper blind are of conventional design for Venetian blinds and are secured to the head channel 12 by conventional ladders 18 and 18' with supporting cross rungs 20 and 20' and lift cords 22 and 22' passing through corresponding route holes in the slats 16 in a manner known in the art. The lift cords terminate in head channel 12 and pass therethrough to depend therefrom to raise the upper blind in a manner also known in the art. The upper head channel 12 in this case contains no lift cord locking mechanism when the pitch of the ceiling is not substantial, because there is insufficient gravitational force to extend the blind under this condition.

A bottom channel 24 is provided at the lower portion of the upper blind P which, however, is not a conventional bottom rail. Instead, it is a modified U-shaped head channel disposed on its side with respect to the slats 16 of the upper blind P and having a vertical depth equal to or less than the width of slats 16.

Figure 5:
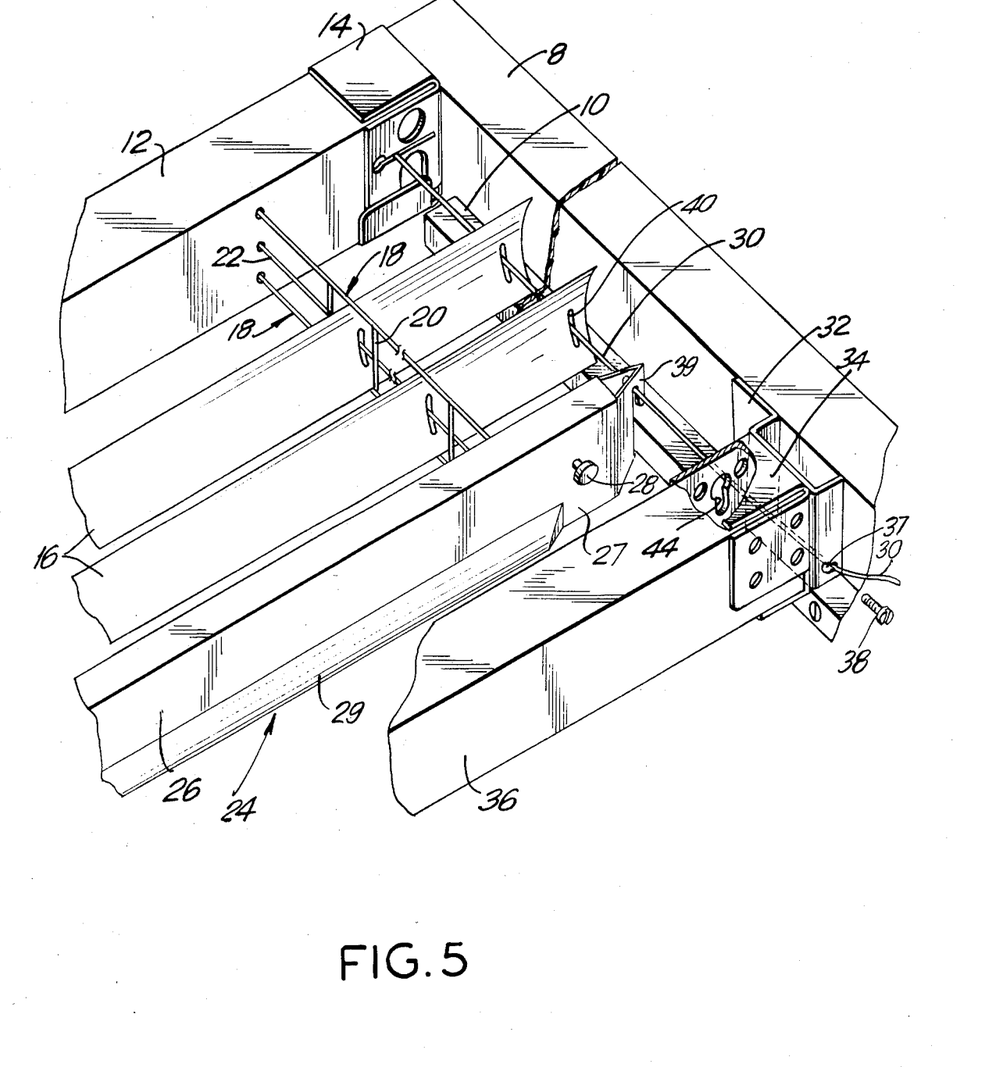
FIG. 5 is a partial broken view, in perspective, taken from above the top of the right side of the pitched blind showing in more detail the suspension means and means of attachment thereof to the lower blind for curved portion C.
Figures 9, 10:
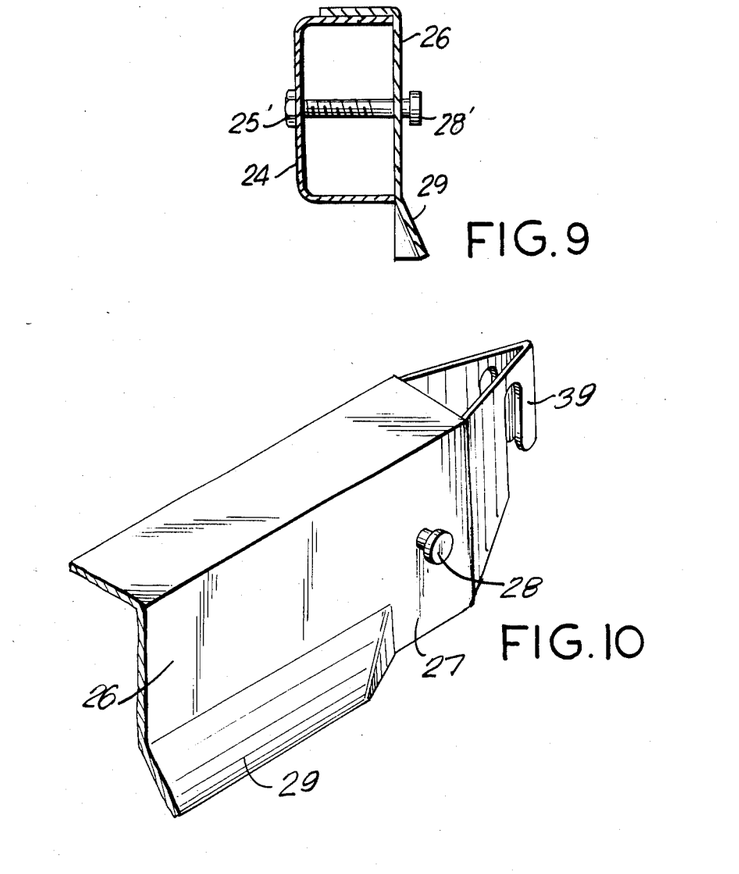
FIG. 9 is an end view of the bottom channel 24 of upper blind P.
FIG. 10 is a partial perspective view of a cover plate 26 for the bottom channel of FIG. 9.

The lower exposed end of U-shaped bottom channel 24 is provided with a cover plate 26 extending over channel 24 (see FIGS. 9 and 10) which in turn carries lugs 28 and 28' for attaching upper blind P to lower blind C (see FIGS. 5, 9 and 10).

Lugs 28 and 28' are advantageously formed by the heads of bolts which are adapted to pass through cover plate 26 and the upper side of U-shaped channel 24 to engage corresponding nuts 25 (not shown) and 25' to affix cover plate 26 to bottom channel 24. Cover plate 26 is provided on each end thereof with a substantially vertical depending skirt portion 27 and 27' (not shown) on each end thereof and above which is situated lugs 28 and 28' to facilitate attachment of the upper blind P to the lower blind C.

Since the slats of the upper blind P ride higher than the slats on the lower blind C, as will be apparent from the following more detailed description, part of the mechanism in the head channel of lower blind C would ordinarily be exposed to the viewer. Accordingly cover plate 26 of the upper blind P is provided with a downwardly projecting flange portion 29 at an angle of about 45° which is adapted to abut the head channel 36 of lower blind C and obscure the mechanism therein contained from view.

The outer peripheries of slats 16 are so dimensioned with respect to mullions 8 and 8' and supporting rails 10 and 10' that they freely ride on rails 10 and 10' and with sufficient clearance so that the ends thereof do not bind on mullions 8 and 8'. However, in order to prevent such binding, e.g. due to canting or twisting during opening or closing of the blind, guide wires 30 and 30', preferably of stainless steel, are provided between upper supporting brackets 14 and 14' and lower guide wire brackets 32 and 32' which are respectively attached to the mullions 8 and 8' above supporting rails 10 and 10'.

End brackets 34 and 34' supporting a head channel 36 for the lower blind C are attached to the lower guide wire brackets 32 and 32', respectively.

These guide wires do not support the slats 16 which are indeed supported on the outer edges thereof by supporting rails 10 and 10', unlike guide wires of the prior art which are used as supporting means.

The guide wires 30 and 30' are tensioned between mounting brackets 14 and 14' and brackets 32 and 32' by providing each guide wire on the inside of brackets 14 and 14' with a swaged copper bead on the wire and by providing each guide wire bracket 32 and 32' with a tensioning screw means 38 and 38' to tighten the same in a keyhole slot 37 and 37' in brackets 32 and 32', respectively. (See FIGS. 4 and 5). As shown in FIG. 5 the wire 30 passes through the smaller part of slot 37 so that it can be bent around screw 38 and secured in place. Moreover, the guide wires are located above the supporting rails 10 and 10' and accordingly are hidden from view below the blind.

The ends of each slat in the upper blind P are provided with oblong vertical routing holes 40 and 40' to receive corresponding guide wires 30 and 30'. These holes are located inwardly from the outer edge of each slat 16 at a distance sufficient to locate the guide wires and conceal the same above the supporting rails 10 and 10' and hide the guide wires from below.

In other words, the routing holes and guide wires are disposed near the outer periphery of each slat 16 above rails 10 and 10' only to guide the slats during extending and retracting thereof but not to support the same and are normally hidden from view (see FIG. 5).

On each end of bottom rail 24 there is provided a hook 39 and 39' adapted to engage guide wires 30 and 30', respectively, to support bottom channel 24 when when it is elevated or retracted. This hook is advantageously formed by folding a metal strip as shown in FIG. 5 and inserting the same under tension with one side within U-shaped bottom channel 24 and the other side within cover plate 26. However, other means may be provided for such suspension, such as an extension of cover plate 26 to provide a hook or a separate hook suspension means otherwise attached to bottom channel 24.

Tilting of the slats 16, when in the extended position to open and close the same, is accomplished in a conventional manner by a tilting wand (not shown) depending from upper head channel 12, as for example shown in U.S. Pat. No. 3,425,479.

It has been found that unless the ladders 18 and 18' of the upper blind P are maintained under tension, the blind slats 16 tend to flop and become disengaged from the supporting rails 10 and 10'. Accordingly, the ladders are maintained at all times under tension, which is accomplished by attaching the bottom legs of ladders 18 and 18' to each other, through spring tensioning means 42 and 42' within bottom channel 24, as more fully illustrated in FIGS. 6 and 7. The tensioning means may be an extension spring to which the respective legs of the ladder cords are affixed or any other equivalent tensioning means to accomplish the same result.

Figure 6:
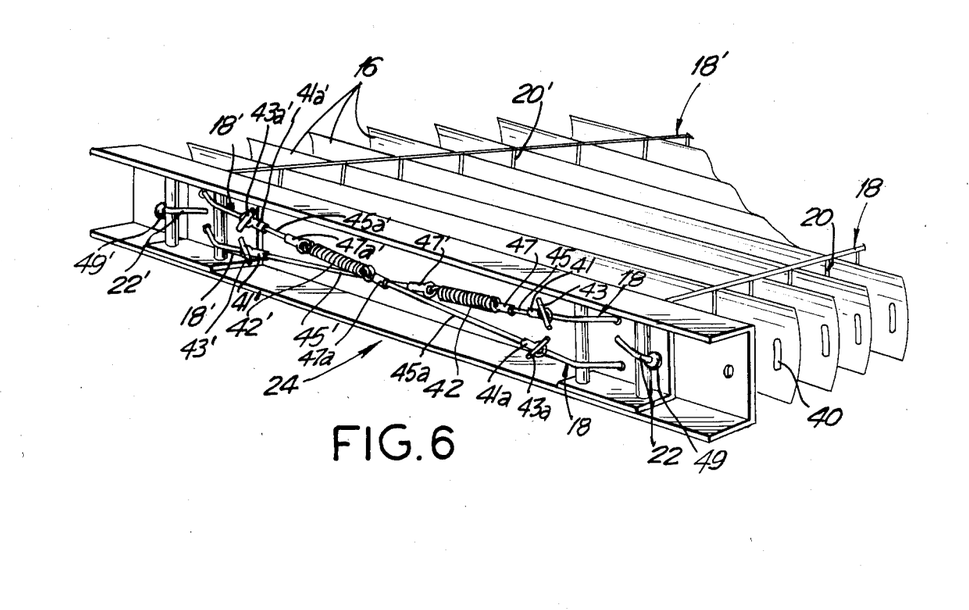
FIG. 6 is a bottom end view, in perspective, showing the inside of the bottom rail channel of the pitched blind, illustrating one means of tensioning the ladders supporting the slats.
Figure 7:
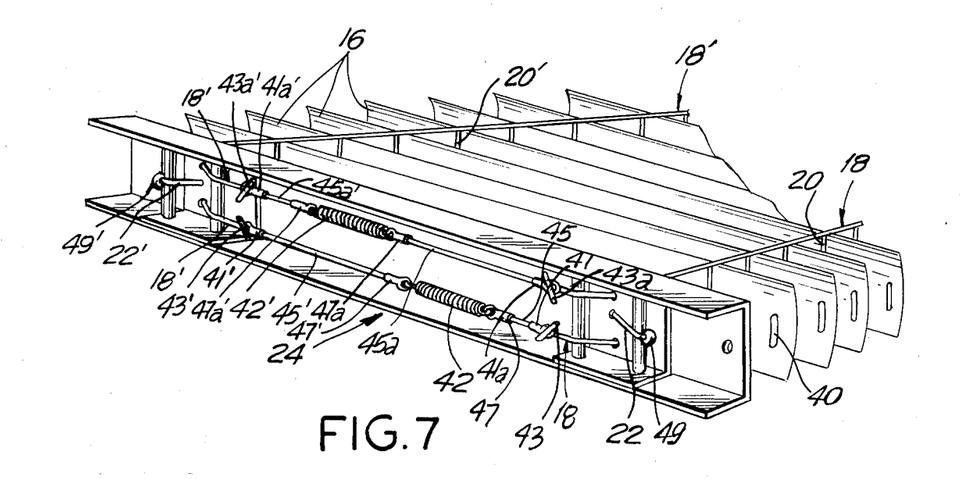
FIG. 7 is a bottom end view, in perspective, showing the inside of bottom rail channel of the pitched blind, illustrating another means of tensioning the ladders supporting the slats.

FIG. 6 shows the tensioning means 42,42' connected in criss-cross relationship with the inner and outer legs of ladders 18 and 18', respectively; while FIG. 7 shows the tensioning means 42 and 42' connected in parallel relationship with the legs of the ladders, the outer legs being connected together by one tensioning means 42' and the inner legs by another tensioning means 42. In each case the ladders are maintained under sufficient tension to prevent flopping and disengagement of the slats 16 from the rails 10 and 10' during static suspension and during extending and retracting of the blind.

More specifically, the details of the tensioning system shown in FIGS. 6 and 7 embody on one leg of ladder 18 an eyelet 41 affixed to the ladder by means of a metal barb 43 crimped to the ladder leg and passing through the eyelet 41. Eyelet 41 is affixed to a braided steel wire 45 which is attached to another eyelet 47 to affix the same to spring 42. Spring 42 is attached via another eyelet 47', wire 45', and eyelet 41' to a leg of ladder 18' by barb 43' affixed to that ladder. In like manner, the other leg of ladder 18 is affixed to another leg of ladder 18' through corresponding linkages 41a etc. The ends of lift cords 22 and 22' are retained within channel 24 by split soft metal balls 49 and 49', respectively, crimped onto the ends of the lift cords.

As should be apparent from FIG. 4, the upper blind P is so designed as to be attachable to the lower blind C at point J (FIG. 3). A more detailed perspective view of the right side of the upper blind and the means of attachment thereof to the lower blind is illustrated in FIG. 5, wherein the same elements are given the numbers described above.

Thus, on the upper blind P, the cover plate 26 of lower channel 24 abuts head channel 36 of the lower blind C, whereby the lugs 28 and 28' on channel 24 lock in positive engagement with keyhole slots 44 and 44', respectively, in the faces of end brackets 34 and 34' which support upper head channel 36. The two blinds are thus locked together during normal operation, namely tilting of the slats of both blinds to open and closed positions and raising and lowering of the lower blind C. When it is desired to retract the upper blind P, the lower channel 24 is manually disengaged from the keyhole slot by lifting the lower channel and pulling it away from the end brackets 34 and 34'.

As indicated above, the lower blind C extending beneath the curved surface of the greenhouse is suspended on a head channel 36 supported by end brackets 34 and 34'. The head channel in this case lays on its side rather than in the normal vertical position, although the lift cords 46, 46' between ladders 48, 48' enter the head channel as they would in a conventional blind disposed on a vertical window. The channel 36 is provided inside thereof with conventional tilting and lift cord mechanisms including a lift cord lock (not shown) and the ends of the lift cords 46, 46' depend from the bottom side of the head channel for raising and lowering purposes. A conventional tilt wand (also not shown) depends from the bottom side of head channel 36 for tilting the slats between open and closed positions as known in the art.

The slats 50 of the lower blind C, as in the upper blind P, ride on rails 10 and 10'. However, in the lower blind C, they ride only on the inclined and curved portions of rails 10 and 10' from the point of attachment of the upper head channel 36 to the bottom rail 52 (FIG. 4) when the slats and bottom rail 52 pass over these portions. When extended, they are merely guided by the vertical portions of rails 10 and 10'.

The slats 50 of lower blind C, moreover differ significantly from the slats 16 of upper blind P. The slats 50 are provided with notches 54, 54' as illustrated more fully in FIG. 8, cut out from the lower portions of each end of the slats 50 extending horizontally from about the longitudinal center line 55 of each slat to the lower edge thereof. The notches 54 are of a size and dimension as to pass freely over guide rail means 10 and 10' to support the lower blind C on the inclined portions and around the curved portions of the greenhouse ceiling and guide the same along its vertical side walls. Obviously, sufficient clearance must be allowed between the outermost upper ends of slats 50 and the mullions 8 and 8' to provide for free movement of slats 50 with respect to the mullions during raising (retracting) and lowering (extending) of the lower blind C.

In this case no guide wire is necessary to prevent canting or retention of the blind slats 50 and closure of the blind is enhanced as it passes over the inclined and arcuate surfaces of rails 10 and 10' especially when the notches 54 are cut at about the longitudinal center line 55 of each slat 50, thereby providing effective tilt control over the entire length of the blind. When the notches are so positioned, the center line defined by each notch acts as a pivot point or axis for tilting which is readily accomplished without shifting, dragging or scraping of the blind slats on the arcuate portions of rails 10,10'.

The bottom rail 52 is of conventional design and is adapted to be raised and lowered in a known manner. However, when blind C is fully raised or retracted over the curved portions of rails 10 and 10' it would hang down below slats 50 except for provision of pins 53 and 53' attached at about the center of each end thereof and adapted to extend over rails 10 and 10', respectively, in substantial alignment with center line 55 of each slat 50. (See FIG. 4), It is important that the position of the ladders of blind C and the corresponding lift cords be spaced from the ends of notched slats 50 at a relatively short distance from the extreme ends of the slats to prevent the weight of the slats below the curved surfaces, the force exerted by the pull cords during elevation and the force exerted by the outermost ladders on tilting, from causing the notched ends thereof from pulling away from the guide rails 10 and 10', particularly over the curved surfaces. For this purpose, the position of the ladders 48,48' and lift cords 46, 46' is spaced further outwardly than in conventional blinds. More specifically, this is accomplished by spacing the position of said ladders and lift cord holes inwardly from the extreme outer unnotched ends of the slats in blind C at a distance of from about one tenth to one twentieth the length of the slats, measured from the unnotched ends thereof, and preferably about one fifteenth the length of said slats. These limits are relative and not limiting, depending upon the length of the blind slats and the corresponding glass installations.

The slats of conventional Venetian blinds are supported by braided strings forming ladder legs connected by strands forming cross rungs, the slats being freely moveable on such rungs and being restrained only by a lift cord passing through the slats which limits lateral movement. This arrangement is quite effective for installations on vertical windows where during tilting the slats continue to rest on the cross rungs and open or close as the legs of the ladder are manipulated by a tilting mechanism as described in U.S. Pat. No. 3,425,479.

In horizontal and low pitched ceiling installations, however, the slats do not tend to follow the rungs when it is desired to open them from the closed position. Stated differently, the slats tend to remain at rest when in a closed position, due to various factors, and when tilting is attempted, the cross rungs may slide over the slats without lifting the desired edge of the slats from the closed position.

In view of the foregoing, each ladder rung in the horizontal or pitched portion P and in the non-vertical part of curved portion C (in the lowered position) is provided with means for attaching the same to the slat which it supports. In this manner, positive tilting of the slats is achieved, and undesirable sliding of the rungs over the slats is avoided.

Figure 11:
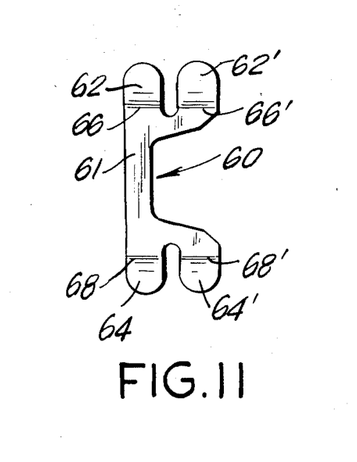
FIG. 11 is a plan view, in the open position, of a slat clip for affixing the cross-rung of a ladder to a slat.
Figure 12:
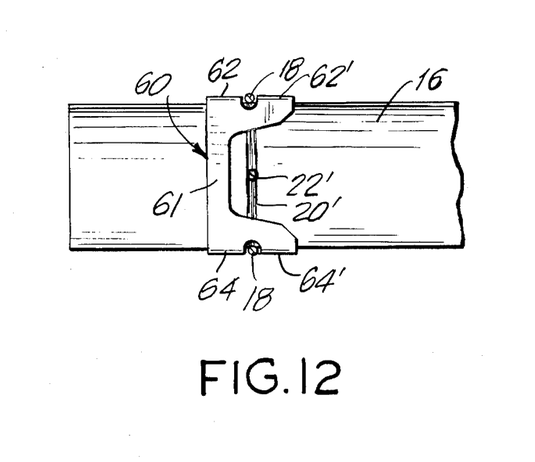
FIG. 12 is a partial broken bottom view of a Venetian blind slat from the concave side showing a slat clip retaining the cross-rung of a ladder to the slat.

This is accomplished by using a slat clip 60 as exemplified in FIG. 11 and applied to the cross rung and slat as in FIG. 12.

Referring to FIG. 11, the clip 60 comprises a soft metal stamping provided at each end of a body portion 61 with foldable wing members 62,62' and 64,64', respectively, adapted by means of corresponding creases 66,66' and 68,68' to be bent around the longitudinal edges of a slat, such as 16. During assembly clip 60 is placed beneath the cross rung 20 of the ladder, such as 18, with the concave side of slat 16 resting above the rung 20 and then the wing members are bent around the edges of the slat and crimped to retain the slat thereon, thereby resulting in the structure shown in FIG. 12.

Such clips as described are known in the art and may be attached in a known manner.

It should be apparent that the system described above provides a unique means for suspension of Venetian blinds in greenhouses having pitched or inclined ceilings merging into curved or arcuate portions and terminating in a vertical side wall.

In the system described, the blind P is provided with means for raising the same, but ordinarily when mounted under a relatively low pitched ceiling it will not readily lower itself, whether or not a cord-lock mechanism is provided, since lowering of conventional blinds relies upon the weight of the slats and supporting rail for this purpose.

Accordingly, the upper blind P of the present invention may be elevated, for example for cleaning without detaching its guide wires, but then is lowered manually by drawing the same downwardly from each end until it is manually locked via its lower channel 24 and lugs 28 and 28' to the end brackets 34 and 34' supporting lower blind C.

However, lower channel 24 may be provided with appropriate lowering cords and pulleys (not shown) for lowering the upper blind P until channel 24 reaches a point contiguous to the upper channel 36 of lower blind C for keyhole attachment as described above.

It should be appreciated that while the invention has been described in particular reference to greenhouse installations with low pitched ceilings, upper blind P is equally adaptable for either pitched or horizontal skylight installations which do not merge with a curved portion as in C. In such event, the bottom ends of guide wires 30,30' are attached to a bracket and lugs 28, 28' on the bottom channel 24 engage keyhole slots or other means of attachment with another or similar brackets to complete the installation.

Having thus described the invention, it should be understood that resort may be had to such modifications and equivalents as fall within the spirit of the invention and the scope of the appended claims.

What is claimed is:

1. A Venetian blind system for the interior of greenhouses having pitched overhead windows and arcuate windows merging into vertical side windows comprising:

a first Venetian blind having a head channel secured at about the peak of said greenhouse, and further having a bottom channel detachably secured at the lower end of said pitched window, and slats supported by cross rungs of ladders suspended between said channels, means attached to said slats for preventing relative movement between said slats and said cross-rungs during tilting of said slats, said first blind being provided with means within said bottom channel to provide tension on forward and rearward legs of said ladders to firmly retain said slats within said ladders;

a second Venetian blind having a head channel secured to an upper portion of a window frame above said arcuate window, the slats of said second blind being supported by cross-rungs of ladders suspended from said head channel, means attached to said slats of said second blind at least under said arcuate window for preventing relative movement between said slats and said cross-rungs during tilting of said slats, the slats of said second blind being provided with notches at the ends thereof adapted to be supported freely on arcuate guide rail means attached to said window frame, and guide rail means on each side of said window frame extending from the peak of said greenhouse to the bottom of the lowermost Venetian blind for supporting said slats of said first blind and for supporting and guiding said notched slats of said second blind while in a static position and during raising and lowering of each said blind respectively, said bottom channel of said first blind being detachably secured to said head channel of said second blind, thereby permitting raising of said first blind upon detachment of said bottom channel, by keyhole slots in end brackets retaining one of said channels and cooperating with flanged lugs extending from the face of the other said channel to lock said channels together in face to face abutment when said lugs are inserted into said keyhole slots and to release said bottom channel of said first blind from said head channel of said second blind when it is desired to elevate the slats of said first blind.

2. A Venetian blind system according to claim 1, wherein said tensioning means in said first blind comprises first spring means connecting corresponding forward ends of said ladders and second spring means connecting corresponding rearward ends of said ladders to equalize the tension applied to forward and rearward legs of said ladders, respectively.

3. A Venetian blind system according to claim 1, wherein said tensioning means in said first blind comprises first spring means connecting a forward end of one ladder with a rearward end of another ladder and second spring means connecting a rearward end of one ladder with a forward end of another ladder to equalize the tension applied to forward and rearward legs of said ladders, respectively.

4. A Venetian blind system according to claim 1, further comprising a guide wire secured under tension to upper and lower portions of said first blind on each side thereof and passing through corresponding holes in and near the outer ends of said slats in said first blind and above said guide rails to prevent said slats from canting and separating from said guide rails during raising and lowering thereof.

5. A Venetian blind system according to claim 1, wherein said bottom channel in said first blind comprises a downwardly open U-shaped channel provided with a cover plate having affixed thereto a pair of flanged lugs cooperating with corresponding keyhole slots in the supporting end brackets of the head channel of said second blind.

6. A Venetian blind system according to claim 5, wherein said cover plate extends below said bottom channel and the lower end thereof is bent, at least in part, to cover the otherwise exposed upper end of the head channel of said second blind.

7. A Venetian blind system according to claim 1, wherein said notched slats in said second blind are provided with holes in alignment with said ladders for receiving a pull cord at each side of said blind to raise and lower said slats, the position of said holes and ladders being spaced inwardly from the extreme outer unnotched ends of said slats at a distance of from about 1/10 to 1/20th the length of said slats measured from the unnotched ends thereof.

8. A Venetian blind system according to claim 1, wherein said notches in said slats of said second blind extend from the bottom thereof to about the longitudinal center line of each slat, whereby said slats are freely slidable and pivotable on said guide rail means.

9. A Venetian blind system according to claim 8, wherein said notches and said guide rail means are of substantially rectangular configuration.

10. A Venetian blind system according to claim 1, wherein said guide rail means is composed of plastic material and is of substantially rectangular configuration.

11. A Venetian blind system according to claim 10, wherein said plastic material is selected from the group consisting of polyvinylchloride, polyethylene and polytetrafluoroethylene.

* * * * *